(12) United States Patent
Lee et al.

(10) Patent No.: US 8,358,594 B2
(45) Date of Patent: Jan. 22, 2013

(54) METHOD OF CONFIGURING CARRIER IN MULTI-CARRIER SYSTEM

(75) Inventors: Young Dae Lee, Seoul (KR); Sung Duck Chun, Seoul (KR); Seung June Yi, Seoul (KR); Sung Jun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 317 days.

(21) Appl. No.: 12/763,639

(22) Filed: Apr. 20, 2010

(65) Prior Publication Data

US 2010/0265847 A1 Oct. 21, 2010

Related U.S. Application Data

(60) Provisional application No. 61/171,440, filed on Apr. 21, 2009.

(30) Foreign Application Priority Data

Apr. 15, 2010 (KR) .................. 10-2010-0034978

(51) Int. Cl.
 *H04L 12/28* (2006.01)

(52) U.S. Cl. ......... 370/254; 370/331; 455/434; 455/436
(58) Field of Classification Search ....................... None
See application file for complete search history.

(56) References Cited

U.S. PATENT DOCUMENTS

| | | | |
|---|---|---|---|
| 7,006,826 B2* | 2/2006 | Cao et al. ....................... 455/438 |
| 7,151,930 B2* | 12/2006 | Roberts ......................... 455/434 |
| 8,027,687 B2* | 9/2011 | Jung et al. ..................... 455/450 |
| 2009/0061878 A1* | 3/2009 | Fischer .......................... 455/436 |
| 2010/0255807 A1* | 10/2010 | Umatt et al. ................ 455/404.1 |
| 2010/0255838 A1* | 10/2010 | Wu ................................ 455/434 |
| 2010/0265847 A1* | 10/2010 | Lee et al. ...................... 370/254 |

\* cited by examiner

*Primary Examiner* — Robert Wilson
(74) *Attorney, Agent, or Firm* — Lee, Hong, Degerman, Kang & Waimey

(57) ABSTRACT

A method of configuring a carrier in a multi-carrier system by a User Equipment (UE) includes receiving, from the first cell, barred-cell information instructing a first cell to be designated as a barred-cell, receiving, from a second cell corresponding to a second carrier, carrier configuration information, instructing a configuration of a first carrier corresponding to the first cell, and configuring a selected carrier based on either the designation of the barred-cell or the carrier configuration information.

11 Claims, 9 Drawing Sheets

10 : Wireless Communication System
11 : Base Station
12 : Mobile Station
15 : Geographical Area or Cell

METHOD OF CONFIGURING CARRIER IN MULTI-CARRIER SYSTEM

CROSS-REFERENCE TO RELATED APPLICATIONS

This application claims the benefit of priority of U.S. Provisional Application No. 61/171,440 filed on Apr. 21, 2009, and Korean Patent Application No. 10-2010-0034978 filed on Apr. 15, 2010, which are incorporated by reference in their entirety herein.

BACKGROUND

1. Field of the Invention

The present invention relates to wireless communication and more particularly, to a method of configuring a carrier in a multi-carrier system.

2. Related Art

Wireless communication systems are widely spread all over the world to provide various types of communication services such as voice or data communication. In general, a wireless communication system is a multiple access system capable of supporting communication with multiple users by sharing available radio resources. Examples of multiple access system include a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system, etc.

In a wireless communication system, one carrier is considered in general even if a bandwidth is differently set between an uplink and a downlink. In the 3rd generation partnership project (3GPP) long term evolution (LTE), one carrier constitutes each of the uplinks and the downlinks on the basis of a single carrier, and the bandwidth of the uplink is symmetrical to the bandwidth of the downlink. However, except for some areas of the world, it is not easy to allocate frequencies of wide bandwidths. Therefore, as a technique for effectively using fragmented small bands, a spectrum aggregation technique is being developed to obtain the same effect as when a band of a logically wide bandwidth is used by physically aggregating a plurality of bands in a frequency domain. The spectrum aggregation includes a technique for supporting a system bandwidth of 100 mega Hertz (MHz) by using multiple carriers even if, for example, the 3GPP LTE supports a bandwidth of up to 20 MHz, and a technique for allocating an asymmetric bandwidth between the uplink and the downlink.

Each carrier can be operated as a cell. Further, a UE can designate a specific cell as a barred-cell. The UE cannot select or reselect the barred-cell, and it is also prohibited from accessing the barred-cell. A UE can designate a specific cell as a barred-cell in the following several cases. For example, when a System Information Block (SIB) SIB1 of a specific cell indicates cellBarred, when a System Information Block SIB2 of a specific cell has designated the prohibition of access to an attempt to the specific call, when a Radio Resource Control (RRC) connection request rejection message is received from a specific cell, when a specific cell does not support a frequency band supported by a UE, and when a higher layer (i.e., an NAS layer) of RRC releases the RRC connection of a UE after RRC connection, a corresponding cell is designated as a barred-cell.

If one cell is designated as a barred-cell, a UE is unable to select or access the corresponding cell. Accordingly, although a BS instructs the configuration of a specific carrier corresponding to the barred-cell, the UE is unable to configure the specific carrier. Since the UE does not comply with the instruction set by the BS, a problem arises in configuring a carrier. Accordingly, there is a need for a method of efficiently configuring a carrier in a multi-carrier system.

SUMMARY

The present invention has been devised in view of the above problems, and it is an object of the present invention to provide a method of efficiently configuring a carrier, in which a UE cancels or maintains the designation of a barred-cell for a carrier designated as the barred-cell in a multi-carrier system.

According to an aspect of the present invention, a method of configuring a carrier in a multi-carrier system by a User Equipment (UE) is provided. The method includes receiving cell aggregation information defining a plurality of aggregated cells; identifying a first cell from the plurality of aggregated cells; wherein if the first cell is determined as being barred, each of the other cells of the plurality of aggregated cells is considered to be barred and if the first cell is determined to be not barred each of the cells of the plurality of aggregated cells is considered to be not barred.

According to another aspect of the present invention, a method of configuring a carrier in a multi-carrier system by a UE is provided. The method includes detecting a failure of a radio link of a UE using a first cell of a plurality of aggregated cells; performing an RRC connection reestablishment procedure using a second cell when the failure of the radio link is detected; wherein the second cell belongs to the plurality of aggregated cells if the first cell is considered as not barred, otherwise the second cell does not belong to the plurality of aggregated cells if the first cell is considered as barred.

A third aspect of the invention provides a user equipment (UE) for configuring a carrier in a multi-carrier system, the user equipment (UE) comprising: a transceiver for receiving cell aggregation information defining a plurality of aggregated cells; a processor for identifying a first cell from the plurality of aggregated cells; wherein if the first cell is determined as being barred, each of the other cells of the plurality of aggregated cells is considered to be barred and if the first cell is determined to be not barred each of the cells of the plurality of aggregated cells is considered to be not barred.

In embodiments of the invention:
barred-cell information indicating whether or not the first cell is barred may be received or transmitted through a broadcast channel of the first cell.
barred-cell information indicating whether or not the first cell is barred may be included in system information of the first cell.
the method may include designating the first cell and each of the other cells of the plurality of aggregated cells as a barred-cell when the first cell is determined to be barred.
the method may include performing Radio Resource Control (RRC) connection to a second cell which does not belong to the plurality of aggregated cells when the first cell is determined to be barred.
carrier configuration information may be received by being included in one of an RRC connection reconfiguration message or a MAC control element message;
an RRC connection reconfiguration complete message may be sent to the first cell if the selected carrier is the first carrier
detecting a failure of a radio link may include comparing a number of in-synchronization states with a minimum number of requirements until a timer expires, the timer is driven in response to an out-of-synchronization state of the radio link.

in some embodiments if the number of in-synchronization states is equal to the minimum number of requirements before the timer expires, the failure of the radio link is not detected.

in some embodiments if the number of in-synchronization states is less than the minimum number of requirements when the timer expires, the failure of the radio link is detected.

In accordance with embodiments of the present invention, since the designation of a barred-cell can be canceled or maintained on the basis of priority of the designation of the barred-cell and carrier configuration information, problems occurring when a carrier for the barred-cell is configured can be reduced.

DESCRIPTION OF EXEMPLARY EMBODIMENTS

Figure 1:
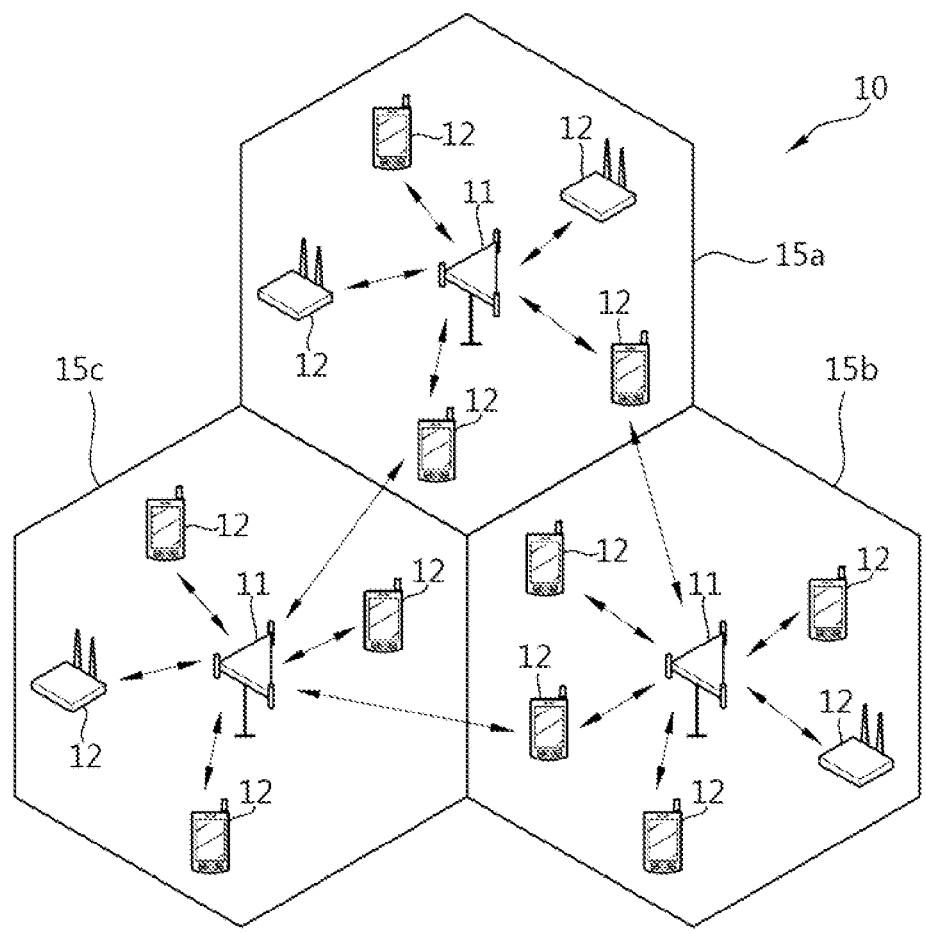
FIG. 1 schematically illustrates a wireless communication system.

FIG. 1 illustrates a wireless communication system. A wireless communication system 10 includes at least one base station (BS) 11. Each base station 11 provides a communication service to a particular geographical area 15a, 15b, or 15c (which are generally called cells). Each cell may be divided into a plurality of areas (which are also called sectors). A mobile station (MS) 12 may be fixed or mobile, and may be referred to by other names such as user equipment (UE), user terminal (UT), subscriber station (SS), wireless device, personal digital assistant (PDA), wireless modem, handheld device, etc. The BS 11 generally refers to a fixed station that communicates with the MS 12 and may be called by other names such as evolved-node B (eNB), base transceiver system (BTS), access point (AP), etc. Downlink (DL) refers to communication from the BS 11 to the MS 12, and uplink (UL) refers to communication from the MS 12 to the BS 11. In the downlink, a transmitter may be a part of the BS 11 and a receiver may be a part of the MS 12. In the uplink, a transmitter may be a part of the MS 12 and a receiver may be a part of the BS 11.

Spectrum aggregation (or bandwidth aggregation or a carrier aggregation) supports a plurality of carriers. A carrier is defined by a bandwidth and a center frequency. The spectrum aggregation is adopted to support increasing throughput, prevent an increase in a cost due to an introduction of a wideband radio frequency (RF) element, and guarantee compatibility with an existing system. For example, if four carriers are assigned as granularity of carrier unit having a 5 MHz bandwidth, a maximum bandwidth of 20 MHz can be supported.

Spectrum aggregation may be divided into a contiguous spectrum aggregation and a non-contiguous spectrum aggregation. Contiguous spectrum aggregation uses contiguous carriers and the non-contiguous spectrum aggregation uses discontiguous carriers. The number of aggregated carriers may be different in uplink and downlink. When the number of downlink carriers and that of uplink carriers are equal, the aggregation is referred to as symmetric aggregation, and when the numbers are different, the aggregation is referred to as asymmetric aggregation.

The size (i.e., the bandwidth) of aggregated multiple carriers may vary. For example, when five carriers are used to configure a 70 MHz band, they may be configured as 5 MHz carrier (carrier #0)+20 MHz carrier (carrier #1)+20 MHz carrier (carrier #2)+20 MHz carrier (carrier #3)+5 MHz carrier (carrier #4).

In the following description, a multi-carrier system refers to a system supporting multiple carriers based on the spectrum aggregation. Contiguous spectrum aggregation and/or non-continuous spectrum aggregation may be used in the multi-carrier system, and in addition, either the symmetrical aggregation or the asymmetrical aggregation may be used.

Figure 2:
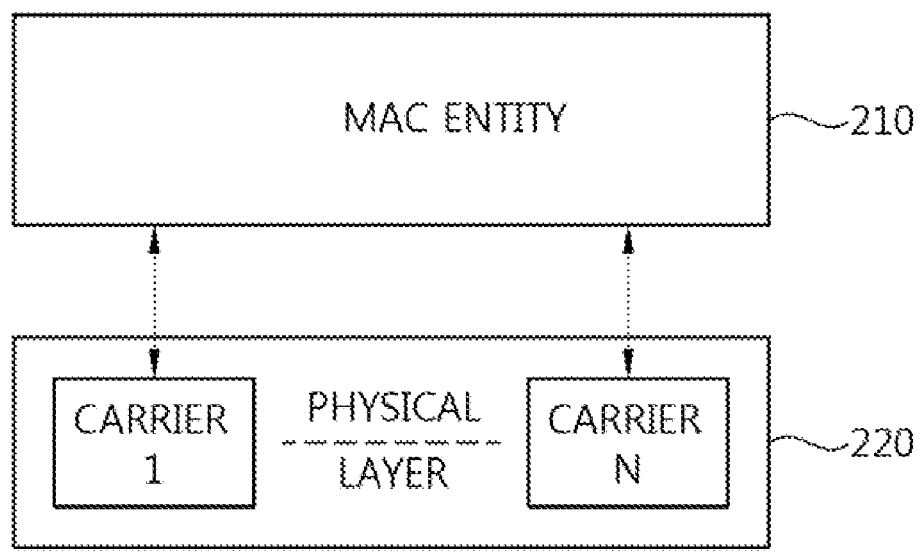
FIG. 2 illustrates an example of a protocol structure for supporting multiple carriers.

FIG. 2 illustrates an example of a protocol structure for supporting multiple carriers. A common medium access control (MAC) entity 210 manages a physical (PHY) layer 220 which uses a plurality of carriers. A MAC management message transmitted by a particular carrier may be applied to other carriers. The PHY layer 220 may operate in a TDD (Time Division Duplex) and/or FDD (Frequency Division Duplex) scheme.

There are several physical control channels used in the physical layer 220. A physical downlink control channel (PDCCH) may inform the UE about the resource allocation of paging channel (PCH) and downlink shared channel (DL-SCH), as well as hybrid automatic repeat request (HARQ) information related to DL-SCH. The PDCCH may carry the uplink scheduling grant which informs the UE about resource allocation of uplink transmission. A physical control format indicator channel (PCFICH) informs the UE about the number of OFDM symbols used for the PDCCHs and is transmitted in every subframe. A physical Hybrid ARQ Indicator Channel (PHICH) carries HARQ ACK/NAK signals in response to uplink transmissions. A physical uplink control channel (PUCCH) carries uplink control information such as HARQ AC/NAK in response to downlink transmission, scheduling request and channel quality indicator (CQI). A physical uplink shared channel (PUSCH) carries uplink shared channel (UL-SCH).

Figure 3:
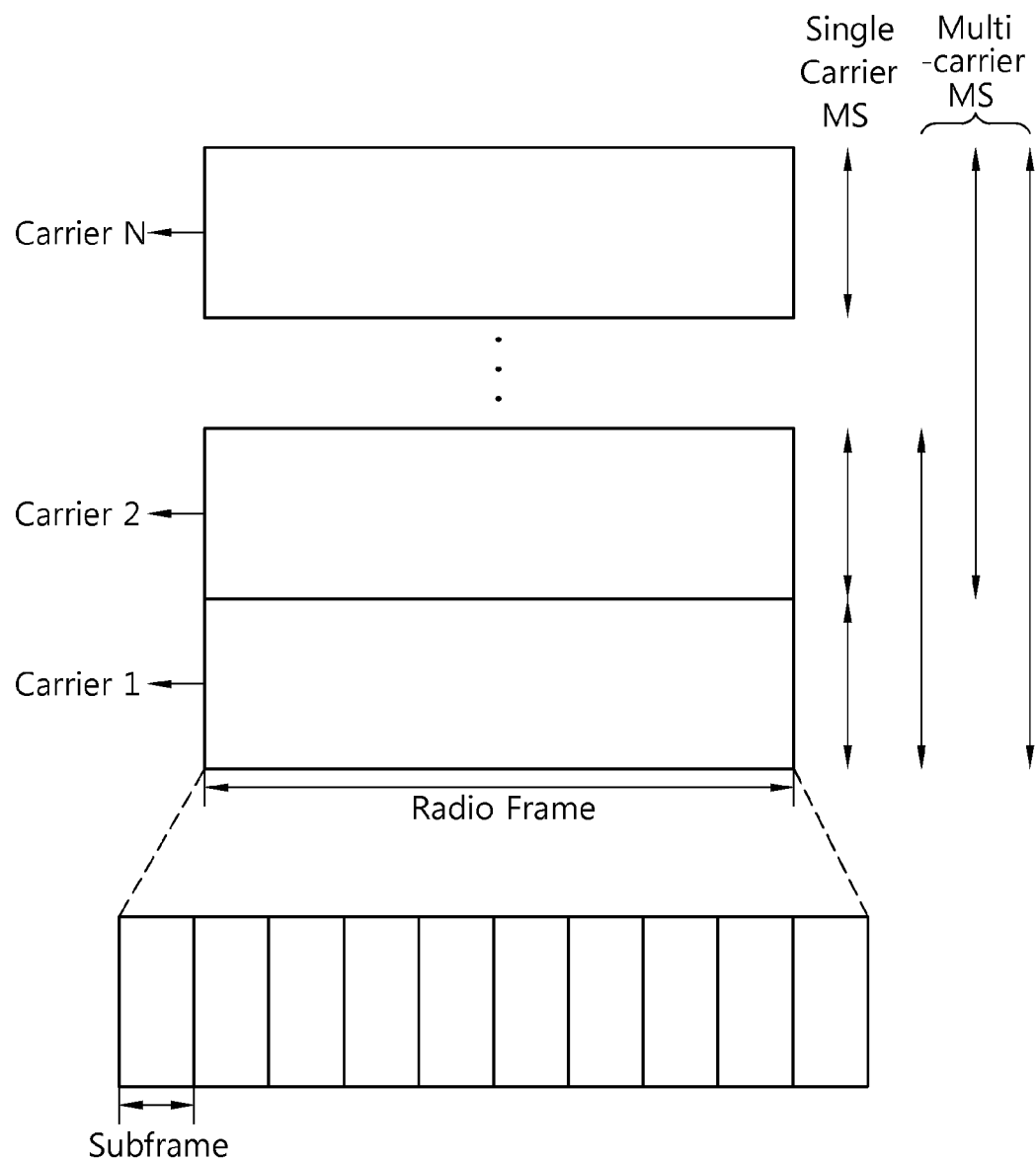
FIG. 3 schematically illustrates an example of a frame structure for operating multiple carriers.

FIG. 3 illustrates an example of a frame structure for operating multiple carriers. A radio frame includes 10 subframes. Each carrier may have its own control channel, i.e. PDCCH. Some carriers may have only a portion of the SFH. Multiple carriers may be or may not be contiguous to each other. An MS may support one or more carriers according to its capability.

Carriers may be divided into a fully configured carrier and a partially configured carrier depending on their directionality. A fully configured carrier refers to a bidirectional carrier that can transmit and/or receive every control signal and data, and the partially configured carrier refers to a unidirectional carrier that can transmit only downlink data. A partially configured carrier may be largely used for an MBS (Multicast and Broadcast Service) and/or an SFN (Single Frequency Network). A fully configured carrier is a standalone carrier for which all control channels including synchronization, broadcast, multicast and unicast control signaling are configured. The partially configured carrier is a carrier configured for downlink only transmission in TDD or a downlink carrier without paired UL carrier in FDD mode. Carriers may be divided into a primary carrier and a secondary carrier depending on whether they are activated. The primary carrier refers to a carrier that is constantly activated, and the secondary carrier refers to a carrier that is activated or deactivated according to particular conditions. Activation means that transmission or reception of traffic data is performed or traffic data is ready for its transmission or reception. Deactivation means that transmission or reception of traffic data is not permitted. In the deactivation mode, measurement can be made or minimum information can be transmitted or received. The MS uses only a single primary carrier or one or more secondary carriers along with the primary carrier. The MS may be assigned the primary carrier and/or the second carriers by the BS. A primary carrier is a carrier used by a BS to exchange traffic and PHY/MAC control signaling (e.g., MAC control messages) with an MS. Secondary carriers are additional carriers which the MS may use for traffic, only per BS's specific commands and rules received on the primary carrier. The primary carrier may be a fully configured carrier, by which major control information is exchanged between the BS and the MS. The secondary carrier may be a fully configured carrier or a partially configured carrier, which is allocated according to a request of the MS or according to an instruction of the BS. The primary carrier may be used for entering of the MS into a network or for an allocation of the secondary carrier. The primary carrier may be selected from among fully configured carriers, rather than being fixed to a particular carrier. A carrier set as the secondary carrier may be changed to a primary carrier.

Figure 4:
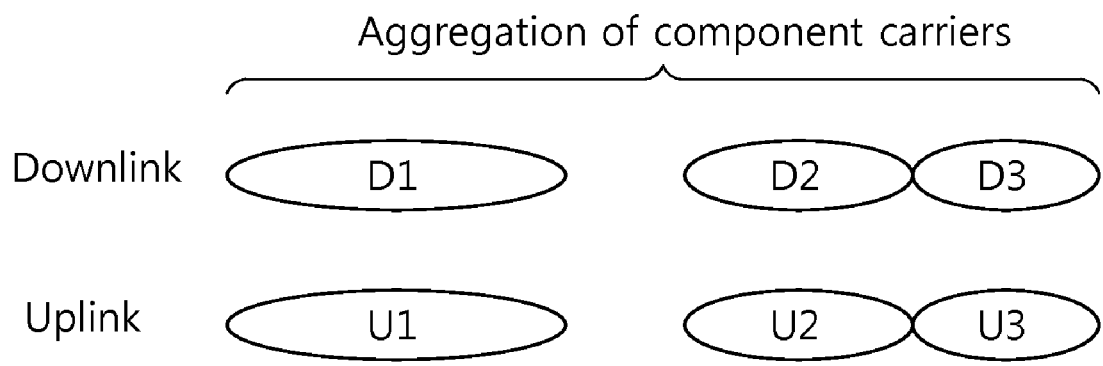
FIG. 4 shows a mapping relation between a downlink carrier and an uplink carrier in a multiple carrier system according to the present invention.

FIG. 4 shows a mapping relation between a downlink carrier and an uplink carrier in a multiple carrier system according to the present invention.

Referring to FIG. 4, in a FDD system, downlink carriers are mapped to respective uplink carriers. D1 is mapped to U1, D2 is mapped to U2, and D3 is mapped to U3. A BS can designate D1, D2, and D3 as an aggregation of downlink carriers and U1, U2, and U3 as an aggregation of uplink carriers. A UE checks a correspondence and a mapping relation between the downlink carriers and the uplink carriers on the basis of system information transmitted by a logical channel BCCH or a UE-dedicated RRC message transmitted by a logical channel DCCH. Although the one-to-one mapping relation between the downlink carriers and the uplink carriers is illustrated in FIG. 4, the downlink carriers and the uplink carriers can have a mapping relation of 1:n or n:1. i.e. a downlink carrier can be mapped to one or more uplink carriers and an uplink carrier can be mapped to one or more downlink carriers.

Hereinafter, a method of configuring a barred-cell and a carrier is described.

A barred-cell refers to a cell to which a UE cannot give access temporarily or permanently. For example, in the case in which a specific cell is a Closed Subscriber Group (CSG) cell which is accessible to only a specific subscriber, the specific cell is operated as a barred-cell for non-subscribers. As another example, in the case in which a specific cell is very congested because it accommodates a large number of UEs, the specific cell is operated as a barred-cell in order for additional UEs to exclude the specific cell from the candidate of a handover target. Barred-cell information indicates whether a corresponding cell is a barred-cell, and it may also be called a cell bar bit. The barred-cell information is typically 1 bit. The barred-cell information can indicate that a specific call is a barred-cell if it is 0, the barred-cell information can indicate that a specific call is not a barred-cell if it is 0, and vice versa. A UE can receive and store information about a plurality of carriers coupled together in a carrier aggregation.

As an example of a method of designating a specific cell as a barred-cell, in the case in which a BS indicates the prohibition of access to the specific cell corresponding to one carrier, a UE can designate the specific cell as a barred-cell and also designate cells, corresponding to one carrier or all the carriers belonging to the same aggregation as the one carrier, as barred-cells. For example, a BS can inform a UE (which is in an RRC connection mode) that downlink carriers D1, D2, and D3 have been configured as a carrier aggregation and then cancel the RRC connection to the UE. In the case in which the RRC connection cancellation message designates a second cell, corresponding to the downlink carrier D2, as a barred-cell, the UE can designate not only the second cell, but also first and third cells, corresponding to the respective downlink carriers D1 and D3 belonging to the same aggregation as the downlink carrier D2, as the barred-cell.

As another example of method of designating a specific cell as a barred-cell, a UE designates only a cell, designated as a barred-cell by a BS, as the barred-cell, but does not designate cells, corresponding to aggregated carriers, if any, as the barred-cell. For example, in the case in which a second cell has been designated as a barred-cell, a UE designates only the second cell as the barred-cell, but does not designate a first cell and a third cell as the barred-cell.

Figure 5:
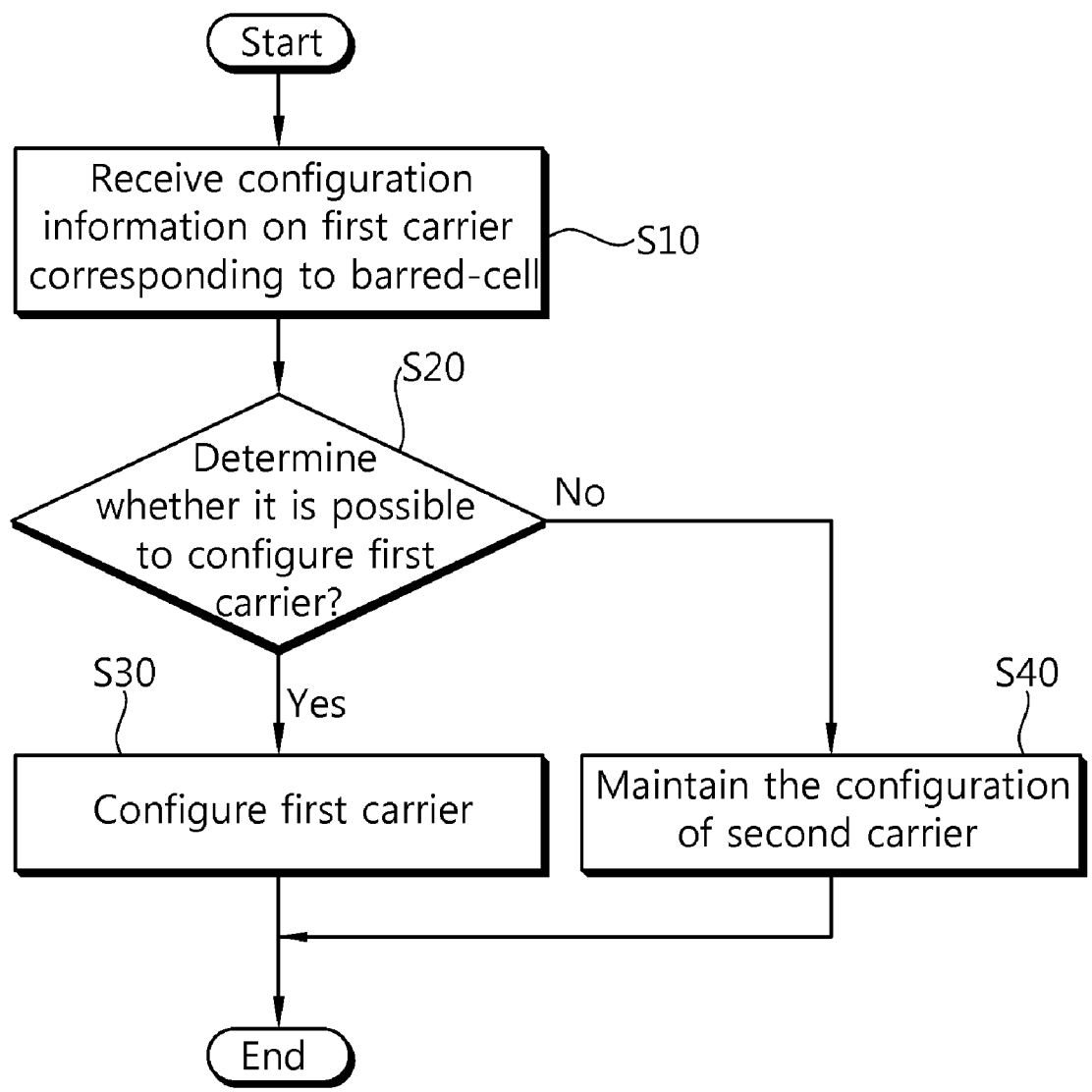
FIG. 5 is a flowchart illustrating a method of a UE configuring a carrier according to an embodiment of the present invention.

FIG. 5 is a flowchart illustrating a method of a UE configuring a carrier according to an embodiment of the present invention.

Referring to FIG. 5, the UE receives carrier configuration information, indicating the configuration of a first carrier corresponding to a first cell designated as a barred-cell, from a second cell corresponding to a second carrier at step S10. The UE determines whether it is possible to configure the first carrier at step S20. The UE configures a carrier on the basis of either the designation of a first cell as the barred-cell or the carrier configuration information about the first carrier which has priority. If, as a result of the determination at step S20, the carrier configuration information about the first carrier precedes the designation of the first cell as the barred-cell, the UE configures the first carrier irrespective of the designation of the barred-cell for the first cell at step S30. It means that a BS has authority over the designation and cancellation of a barred-cell. If, as a result of the determination at step S20, the designation of the barred-cell for the first cell precedes the carrier configuration information about the first carrier, the UE maintains the configuration of the second carrier on the basis of the designation of the barred-cell for the first cell at step S40. It means that the designation of the barred-cell is performed by the BS, but authority over the cancellation of a barred-cell is owned by the UE. If, as described above, the designation of the barred-cell is canceled or maintained on the basis of either the designation of the barred-cell or carrier configuration information which has priority, problems occurring when a carrier for a barred-cell is configured can be reduced. As a preferred example, if the BS previously informs the UE of priority information about the designation of the barred-cell and the carrier configuration information, the UE can more efficiently determine whether to configure the first carrier based on the priority information.

Figure 6:
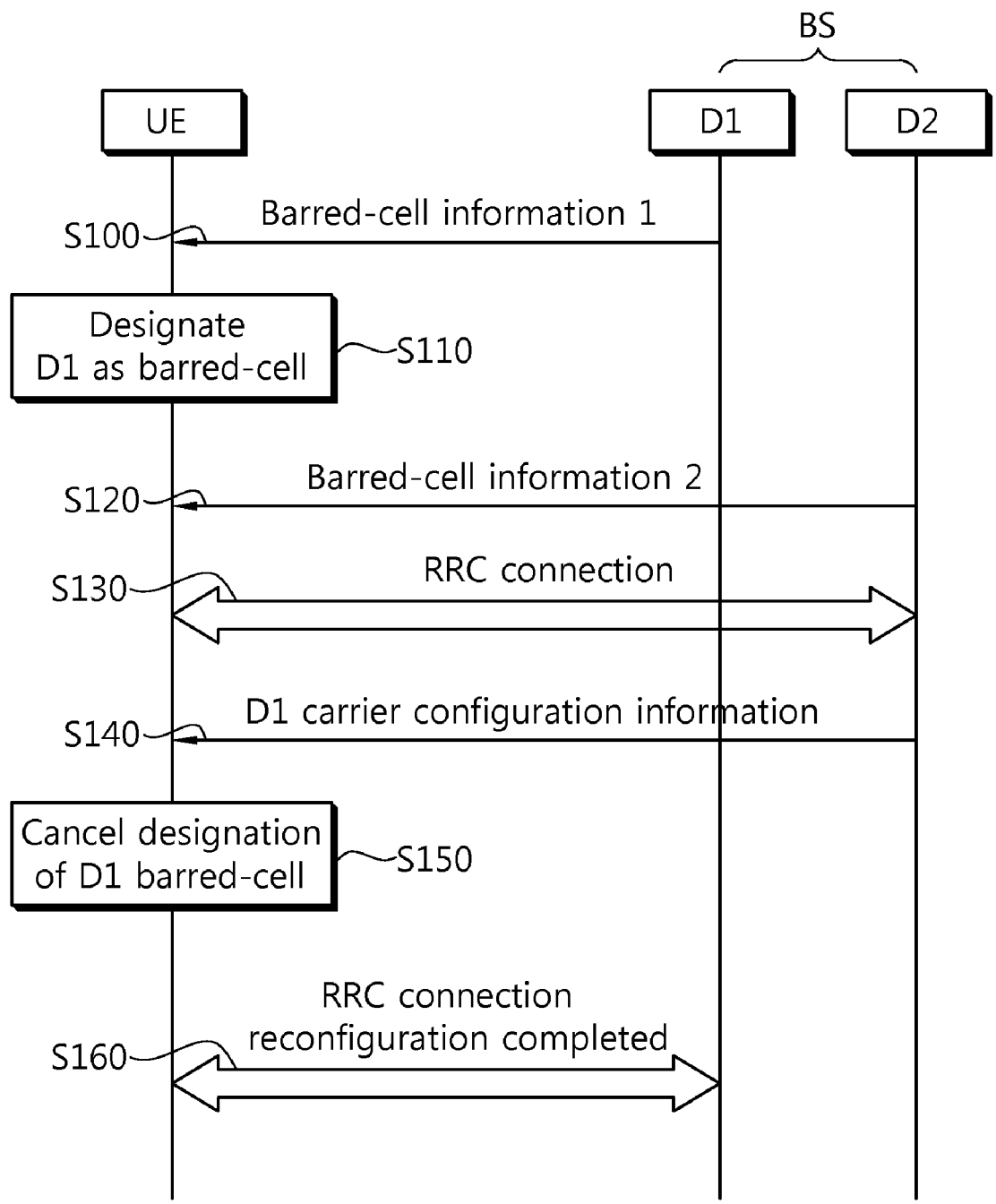
FIG. 6 is a flowchart illustrating a method of configuring a carrier according to another embodiment of the present invention.

FIG. 6 is a flowchart illustrating a method of configuring a carrier according to another embodiment of the present invention. This method corresponds to a case in which, when carrier configuration information about a carrier corresponding to a barred-cell is received in FIG. 5, the corresponding carrier is configured irrespective of the designation of the barred-cell.

Referring to FIG. 6, a UE receives barred-cell information 1, indicating that a first cell corresponding to a downlink carrier D1 is a barred-cell, from a BS at step S100. The barred-cell information can be received by being included in the System Information Block (SIB) of the first cell. Here, the barred-cell information is received through a Broadcast Control CHannel (BCCH). Although the first cell is illustrated to be designated as the barred-cell using the barred-cell information, the UE may designate the first cell as the barred-cell under the instructions of a higher layer of Radio Resource Control (RRC) (for example, an NAS layer). In other words, after the UE has performed RRC connection to the first cell, even though the NAS layer cancels the RRC connection of the UE, the first cell is designated as the barred-cell. Here, the UE may be in the idle mode or the RRC connection mode. If the UE is in the idle mode, the UE receives a system information block through cell selection or cell re-selection. Hereinafter, assuming that the UE is in the idle mode, the method of configuring a carrier is described.

After receiving the barred-cell information 1, the UE designates the first cell as the barred-cell at step S110. When the first cell is designated as the barred-cell, the UE attempts access to other cells other than the first cell in a procedure, such as RRC connection configuration, RRC connection reconfiguration, or RRC connection reestablishment.

The UE selects a second cell corresponding to a downlink carrier D2 again and receives barred-cell information 2 about the second cell from the BS at step S120. If the barred-cell information 2 indicates that the second cell is not a barred-cell, the UE does not designate the second cell as a barred-cell. Likewise, the barred-cell information 2 is transmitted by being included in a System Information Block (SIB) of the second cell.

The UE can access the second cell because the second cell is not a barred-cell. Accordingly, the UE performs an RRC connection procedure for the second cell at step S130. The RRC connection procedure is performed in such a manner that the UE sends an RRC connection request message to the BS, receives an RRC connection message from the BS, and sends an RRC connection complete message to the BS. After the RRC connection procedure is completed, the UE is operated in the RRC connection mode for the second cell.

The BS sends carrier configuration information about the downlink carrier D1 to the UE using a downlink carrier D2 so that the UE can receive a downlink channel by configuring the downlink carrier D1 at step S140. Since the UE is in the RRC connection mode, the carrier configuration information can be included in an RRC connection reconfiguration message and transmitted. In another embodiment, the BS may send carrier configuration information about an uplink carrier U1, corresponding to the downlink carrier D1, to the UE through an RRC connection reconfiguration message so that the UE can send an uplink channel through the uplink carrier U1. The carrier configuration information may be included in an MAC control element message and transmitted.

After receiving the carrier configuration information about the downlink carrier D1 or the uplink carrier U1, the UE cancels the designation of the barred-cell for the first cell at step S150. This is because the carrier configuration information of the BS precedes the designation of the barred-cell. Here, the UE can inform an NAS layer (i.e., a higher layer of RRC) of the cancellation of the designation of the barred-cell. The UE may also cancel the designation of the barred-cell for other downlink carriers (for example, D3 and D4) which belong to the same aggregation as the downlink carrier D1.

After successfully performing the RRC connection reconfiguration procedure, the UE sends an RRC connection reconfiguration complete message to the BS at step S160.

Since the carrier configuration information of the BS precedes the designation of the barred-cell as described above, the UE can cancel the barred-cell on the basis of the carrier configuration information. Accordingly, problems caused by a collision between the configuration of a carrier and the designation of the barred-cell can be resolved.

There are various examples in which, after the RRC connection reconfiguration procedure is completed, the UE designates the first cell as a barred-cell again. For example, if RRC connection between the UE and the BS is cancelled, the UE can designate the first cell as a barred-cell again. In another example, in the case in which the UE has successfully handed over to another BS, the UE can designated the first cell as a barred-cell again. For still another example, if the BS has transferred a cell bar cancel timer to the UE through an RRC connection reconfiguration message, etc., the UE drives the cell bar cancel timer as soon as the timer is received. During the time for which the timer is driven, the UE cancels the designation of the barred-cell for the first cell and designates the first cell as a barred-cell after the timer elapses. For still another example, the UE does not designate the first cell as a barred-cell even through RRC connection to the BS is cancelled and designates the first cell as a barred-cell only when there is a condition that the first cell is designated as the barred-cell.

Figure 7:
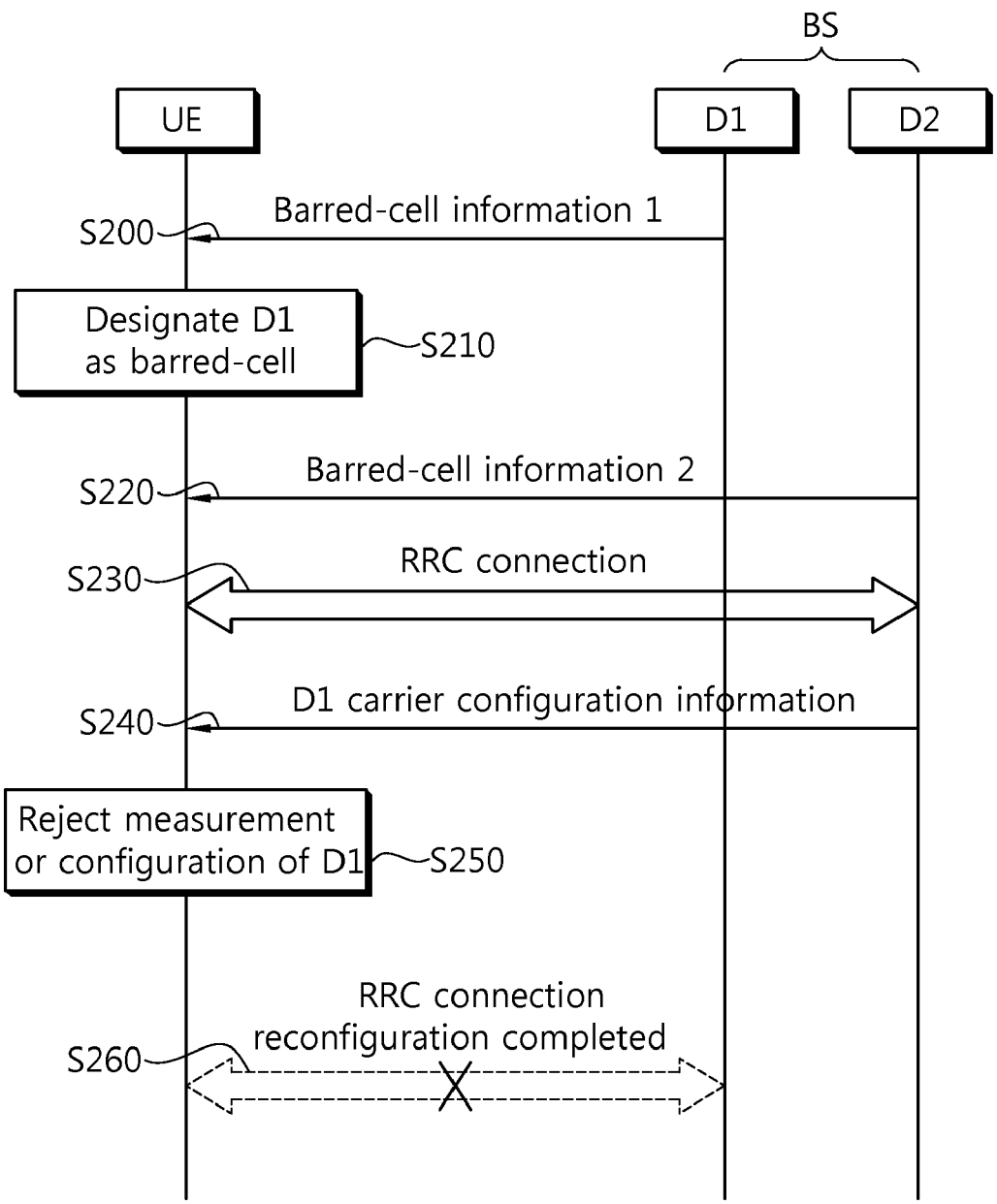
FIG. 7 is a flowchart illustrating a method of configuring a carrier according to yet another embodiment of the present invention.

FIG. 7 is a flowchart illustrating a method of configuring a carrier according to yet another embodiment of the present invention. This method corresponds to a case in which, if a carrier cannot be configured although carrier configuration information corresponding to a barred-cell is received, a UE maintains the configuration of a second carrier on the basis of the designation of a barred-cell.

Referring to FIG. 7, a UE receives barred-cell information 1, indicating that a first cell corresponding to a downlink carrier D1 is a barred-cell, from a BS at step S200. The barred-cell information can be received with it included in the System Information Block (SIB) of the first cell. Here, the barred-cell information is received through a Broadcast Control CHannel (BCCH). Although the first cell is illustrated to be designated as the barred-cell using the barred-cell information, the UE may designate the first cell as the barred-cell under the instructions of a higher layer of Radio Resource Control (RRC) (for example, an NAS layer). In other words, after the UE has performed RRC connection to the first cell, even though the NAS layer cancels the RRC connection of the UE, the first cell is designated as the barred-cell. Here, the UE may be in the idle mode or the RRC connection mode. If the UE is in the idle mode, the UE receives a system information block through cell selection or cell re-selection. Hereinafter, assuming that the UE is in the idle mode, the method of configuring a carrier is described.

After receiving the barred-cell information 1, the UE designates the first cell as the barred-cell at step S210. When the first cell is designated as the barred-cell, the UE attempts access to other cells other than the first cell in a procedure, such as RRC connection configuration, RRC connection reconfiguration, or RRC connection reestablishment.

The UE selects a second cell corresponding to a downlink carrier D2 again and receives barred-cell information 2 about the second cell from the BS at step S220. If the barred-cell information 2 indicates that the second cell is not a barred-cell, the UE does not designate the second cell as a barred-cell. Likewise, the barred-cell information 2 is transmitted with it included in a System Information Block (SIB) of the second cell.

The UE can access the second cell because the second cell is not a barred-cell. Accordingly, the UE performs an RRC connection procedure for the second cell at step S230. The RRC connection procedure is performed in such a manner that the UE sends an RRC connection request message to the BS, receives an RRC connection message from the BS, and sends an RRC connection complete message to the BS. After the RRC connection procedure is completed, the UE is operated in the RRC connection mode for the second cell.

The BS sends carrier configuration information about the downlink carrier D1 to the UE using a downlink carrier D2 so that the UE can receive a downlink channel by configuring the downlink carrier D1 at step S240. Since the UE is in the RRC connection mode, the carrier configuration information can be included in an RRC connection reconfiguration message and transmitted. In another embodiment, the BS may send carrier configuration information about an uplink carrier U1, corresponding to the downlink carrier D1, to the UE through an RRC connection reconfiguration message so that the UE can send an uplink channel through the uplink carrier U1. The carrier configuration information may be included in an MAC control element message and transmitted.

Despite subcarrier configuration information (or measurement information) about a downlink carrier D1, the UE does not cancel the designation of the barred-cell for the first cell and does not perform measurement for the downlink carrier D1 or not configure the downlink carrier D1 at step S250. This is because the designation of the barred-cell precedes the subcarrier configuration information. However, in the case in which carrier configuration information about an uplink carrier U1 corresponding to the downlink carrier D1 is received, the UE can be operated according to the following two cases. In the first case, the UE does not perform measurement for the uplink carrier U1 or not configure the uplink carrier U1, as in the downlink carrier D1. In the second case, although the UE does not configure the downlink carrier D1, the UE configures the uplink carrier U1, sends an uplink channel through the configured uplink carrier U1, and receives a downlink channel through a downlink carrier D2.

If a message, including the carrier configuration information (or measurement information) about the downlink carrier D1 or the uplink carrier U1, is received from the BS because the first cell has been designated as a barred-cell, the UE can request an NAS layer to modify or alleviate the designation of the barred-cell.

In the case in which the UE does not measure the downlink carrier D1 or the uplink carrier U1 and not configure the downlink carrier D1 or the uplink carrier U1, the UE does not send an RRC connection reconfiguration complete message to the BS at step S260. In another embodiment, in the case in which the UE has rejected the measurement (or configuration) of the downlink carrier D1 or the uplink carrier U1, the UE can include information, indicating that the configuration (or measurement) of the downlink carrier D1 or the uplink carrier U1 has been rejected, and a cause of the rejection in an RRC connection reconfiguration complete message and send the RRC connection reconfiguration complete message to the BS. Here, the cause of rejection can include that the first cell is a barred-cell. In the case in which the UE has rejected the measurement (or configuration) of the downlink carrier D1 or the uplink carrier U1 or the case in which the UE sends the RRC connection reconfiguration complete message including the cause of rejection, the UE can request an NAS layer to modify or alleviate the designation of the barred-cell.

Meanwhile, the UE can cancel the RRC connection to the BS and designate another carrier (for example, D3), belonging to the same aggregation as the downlink carrier D1, as a barred-cell. In the case in which the UE has rejected the measurement or configuration of the downlink carrier D1 or the uplink carrier U1, the UE can reject all or only some (for example, measurement information or carrier configuration information about the downlink carrier D1 or the uplink carrier U1) of commands, included in the RRC connection reconfiguration complete message.

Although not shown in the drawing, the BS can send an RRC connection cancellation message, including cell bar instruction information, to the UE. When the RRC connection cancellation message is received, the UE can cancel the RRC connection and designate a cell, corresponding to a specific carrier, as a barred-cell on the basis of the cell bar instruction information included in the RRC connection cancellation message.

As described above, a BS has authority over the designation of the barred-cell. However, although carrier configuration information for the barred-cell is received, a UE has authority over the rejection of the barred-cell, and so the UE can determine whether to access the barred-cell. Accordingly, problems accompanied by an instruction to move to a barred-cell can be solved.

Figure 8:
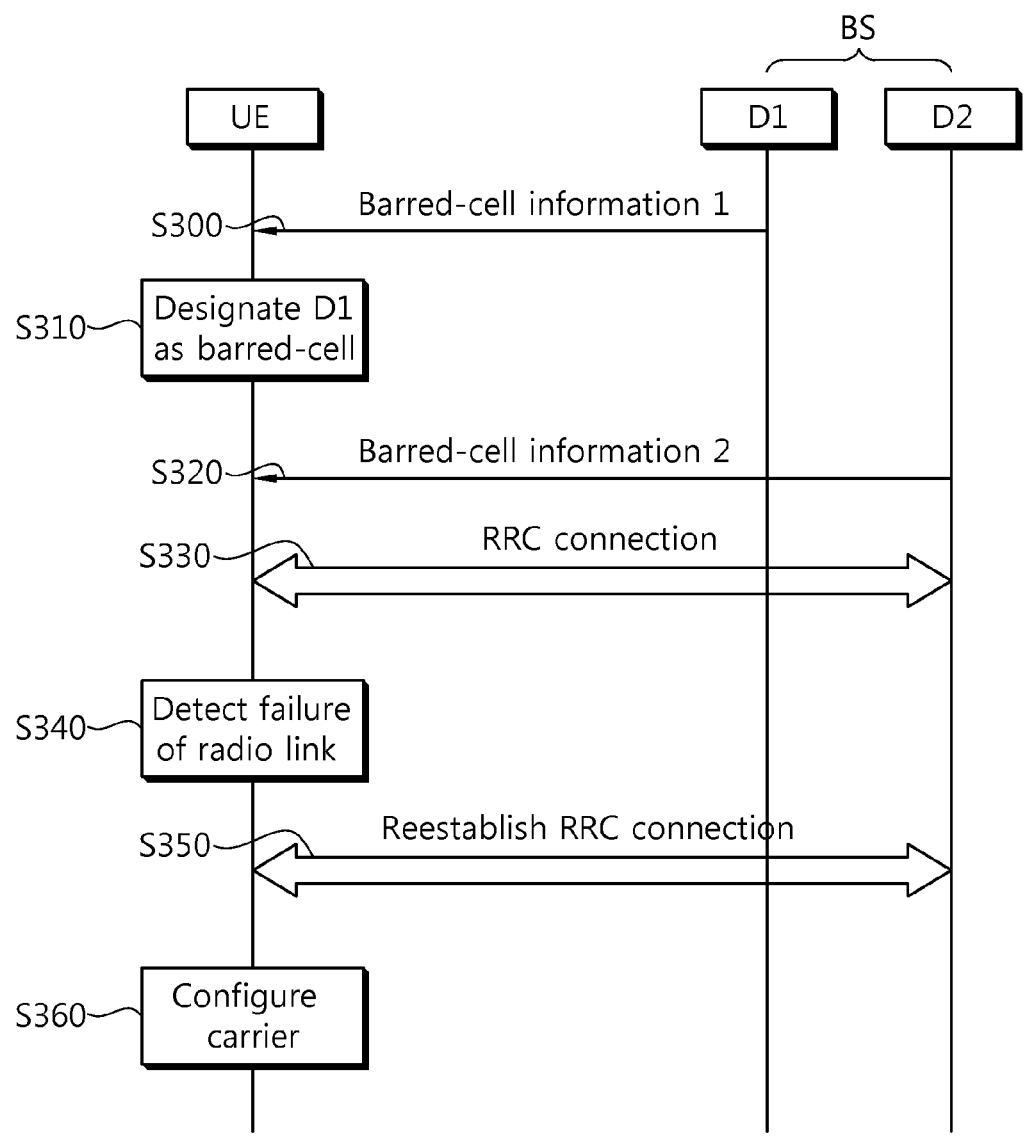
FIG. 8 is a flowchart illustrating a method of configuring a carrier according to yet another embodiment of the present invention.

FIG. 8 is a flowchart illustrating a method of configuring a carrier according to yet another embodiment of the present invention.

Referring to FIG. 8, a UE receives, from a BS, barred-cell information 1 indicating that a first cell corresponding to a downlink carrier D1 is a barred-cell at step S300. After receiving the barred-cell information 1, the UE designates the first cell as the barred-cell at step S310. The UE selects a second cell corresponding to a downlink carrier D2 again and receives barred-cell information 2 about the second cell from the BS at step S320. Since the second cell is not a barred-cell, the UE can access the second cell. Accordingly, the UE performs RRC connection to the second cell at step S330.

The UE detects the failure of a radio link connected by the downlink carrier D2 at step S340. If the failure of the radio link occurs, the UE has to re-establish the RRC connection. However, if there is a barred-cell, a method of processing the barred-cell can be problematic. This is because, when the UE re-establish the RRC connection, the UE has to determine whether to cancel the designation of the barred-cell or maintain the existing barred-cell without change. The method of detecting the failure of a radio link is described later with reference to FIG. 9.

If the failure of the radio link is detected, the UE performs an RRC connection reestablishment procedure with the BS at step S350. The RRC connection reestablishment procedure is performed in such a manner that the UE sends an RRC connection reestablishment request message to the BS, receives an RRC connection reestablishment message from the BS, and receives an RRC connection reestablishment complete message from the BS.

For example, when the RRC connection is re-established, the UE can cancel the designation of the barred-cell for the first cell. In this case, when a cell for the RRC connection reestablishment procedure is selected, the UE selects cells including the first cell. Since the first cell is also not the subject of selection, the UE can be connected to the first cell through the RRC connection reestablishment procedure.

For another example, when the RRC connection is reestablished, the UE may designate the first cell as a barred-cell again. In this case, when a cell for the RRC connection reestablishment procedure is selected, the UE excludes the first cell and selects the cell. Since the first cell is also not the subject of selection, the UE cannot be connected to the first cell through the RRC connection reestablishment procedure.

Figure 9:
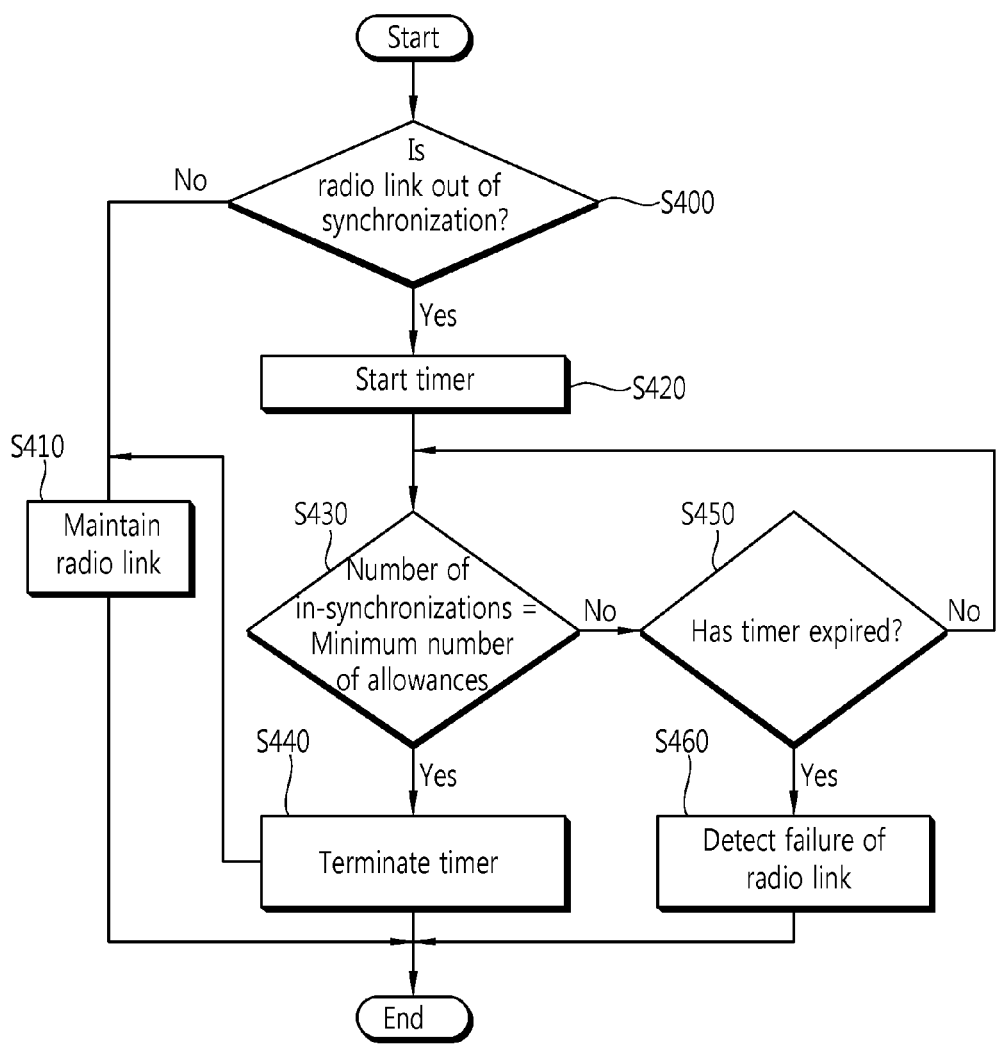
FIG. 9 is a flowchart illustrating a method of detecting the failure of a radio link according to an embodiment of the present invention.

FIG. 9 is a flowchart illustrating a method of detecting the failure of a radio link according to an embodiment of the present invention.

Referring to FIG. 9, a UE determines whether a radio link is in an out-of-synchronization state at step S400. If, as a result of the determination, the radio link is determined to be in the out-of-synchronization state, a physical layer of the UE informs an RRC layer that the radio link is in the out-of-synchronization state. Here, if the physical layer informs the RRC layer that the number of out-of-synchronization states is a maximum number of allowances (N310) or less, the UE maintains the radio link at step S410. However, if the physical layer informs the RRC layer that the number of out-of-synchronization states is equal to a maximum number of the allowances (N310), the RRC layer drives a timer T310 at step S420.

During the time for which the timer is driven, the physical layer of the UE determines whether the number of in-synchronization states is equal to a minimum number of the requirements (N311) at step S430. If, as a result of the determination, the number of in-synchronization states is determined to be equal to a minimum number of the requirements, the UE terminates the timer at step S440 and maintains the radio link at step S410.

However, if, as a result of the determination at step S430, the number of in-synchronization states is determined not to be equal to a minimum number of the requirements, the UE determines whether the timer has expired at step S450. If, as a result of the determination at step S450, the timer is determined to have expired, the UE detects the failure of the radio link at step S460 and announces a Radio Link Failure (RLF). When the RLF is announced, the RRC layer of the UE selects a cell with an excellent quality by performing cell selection and performs an RRC connection reconfiguration procedure.

If, as a result of the determination at step S450, the timer is determined not to have expired, the physical layer of the UE determined whether the number of in-synchronization states is equal to a minimum number of the requirements at step S430.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of configuring a carrier in a multi-carrier system, the method comprising:
   parsing received cell aggregation information in order to determine first cell information and second cell information;
   detecting a failure of a radio link of user equipment (UE) using a first cell of a plurality of aggregated cells, wherein the first cell of the plurality of aggregated cells is considered barred or not barred; and
   performing a radio resource control (RRC) connection reestablishment procedure using a second cell when the failure of the radio link of the UE is detected,
   wherein the second cell belongs to the plurality of aggregated cells when the first cell of the plurality of aggregated cells is considered not barred and the second cell does not belong to the plurality of aggregated cells when the first cell of the plurality of aggregated cells is considered barred,
   wherein detecting the failure of the radio link of the UE comprises comparing a determined number of in-synchronization states counted during a time period to a predetermined threshold, and
   wherein the time period starts upon detection of a first out-of-synchronization state and extends for a predetermined time.

2. The method of claim 1, wherein:
   no failure of the radio link of the UE is detected when the determined number of in-synchronization states is equal to or greater than the predetermined threshold, and
   a failure of the radio link of the UE is detected when the determined number of in-synchronization states is less than the predetermined threshold.

3. A method of performing a radio resource control (RRC) connection reconfiguration procedure in a multi-carrier system, the method comprising:
   receiving, by a user barred-cell information indicating whether or not a first cell is considered a barred-cell;
   designating, by the UE, the first cell as the barred-cell when the first cell is indicated as a barred-cell;
   performing, by the UE, the RRC connection reconfiguration procedure for a second cell when the first cell is indicated as a barred-cell;
   receiving, by the UE, carrier configuration information related to the first cell via the second cell;
   configuring, by the UE, the first cell according to the received carrier information in order to enable the UE to receive a downlink channel;
   canceling, by the UE, the designation of the first cell as the barred-cell; and
   performing, by the UE, the RRC connection reconfiguration procedure for the first cell,
   wherein the first cell belongs to a plurality of aggregated cells,
   wherein the second cell belongs to the plurality of aggregated cells when the first cell is considered not barred, and
   wherein the second cell does not belong to the plurality of aggregated cells when the first cell is considered barred.

4. The method of claim 3, wherein the barred-cell information is received via a system information block (SIB) of the first cell.

5. The method of claim 3, wherein the barred-cell information is received via a broadcast control channel (BCH).

6. The method of claim 3, wherein the first cell is designated as the barred-cell based on the barred-cell information.

7. The method of claim 3, wherein the first cell is designated as the barred-cell based on an instruction of a higher layer of an RRC.

8. The method of claim 3, wherein the carrier configuration information is received via an RRC connection reconfiguration message.

9. The method of claim 3, wherein the carrier configuration information is received via a media access control (MAC) message.

10. The method of claim 3, wherein the carrier configuration information includes information related to an uplink carrier in the first cell.

11. The method of claim 3, further comprising informing a non-access stratum (NAS) layer about the cancellation of the designation of the first cell as the barred-cell.

* * * * *